Nov. 21, 1939.    L. E. GOFF    2,180,517
MAKING CELLULOSE DERIVATIVES
Filed Nov. 28, 1936    2 Sheets-Sheet 1

INVENTOR
Lionel E. Goff
BY
Edwards, Bower & Hoyt
ATTORNEYS

Nov. 21, 1939.   L. E. GOFF   2,180,517
MAKING CELLULOSE DERIVATIVES
Filed Nov. 28, 1936    2 Sheets-Sheet 2

Patented Nov. 21, 1939

2,180,517

UNITED STATES PATENT OFFICE 2,180,517

MAKING CELLULOSE DERIVATIVES

Lionel Elmer Goff, Alton, Ill., assignor to The Cellulose Research Corporation, East Alton, Ill., a corporation of Delaware Application November 28, 1936, Serial No. 113,155

2 Claims. (Cl. 260—227)

This invention relates to the preparation of cellulose from wood for the production of cellulose derivatives and more particularly to the production of cellulose acetate.

An object of this invention is to provide an economical process for the production of esterifiable cellulose from commercial sulfite bleached and unbleached wood pulp.

Another object of this invention is to provide a process for the production of cellulose derivatives, cellulose acetate in particular, from wood pulp.

A further object is the treatment or conditioning of cellulose, derived by conventional processes, to improve or modify its purity and/or physico-chemical condition to render it suitable for acetylation and other uses of chemical cellulose.

A further object of the present invention is the provision of cellulose derivatives, such as cellulose acetate, which are highly homogeneous and are substantially free from the products of acetolysis.

A still further object of the invention is the provision of a process for economically converting relatively low purity cellulose, which is prepared from wood pulp produced by conventional methods, into cellulose derivatives, and cellulose acetate in particular.

In the accompanying drawings, which illustrate certain features of the present invention.

Up to the present time, cotton linters has been, practically speaking, the sole source of supply for the cellulose raw material used in manufacturing certain of the derivatives of cellulose, such as cellulose acetate and certain other cellulose esters and ethers.

The objectionable features incident to the use of cotton linters as the basic raw material for cellulose acetate and other cellulose derivatives have greatly stimulated attempts to develop cellulose from other sources, particularly wood; which cellulose would be more satisfactory as to both quality and cost than cotton linters. However, the wood celluloses of the prior practices have heretofore neither attained the high purity of refined cotton linters, nor have they responded satisfactorily to acetylating reagents.

For example, the following Table I shows certain factors of purity between the two types of cotton linters regularly employed in the production of cellulose acetate and, under precisely the same tests, the corresponding values for the purest commercial grade of wood cellulose available. In the table, column A sets forth the values for a typical sample of so-called low viscosity cotton linters, column B sets forth the values for a typical sample of so-called high viscosity cotton linters, and column C sets forth the values for the aforesaid prior art wood cellulose.

TABLE I

| | A | B | C |
|---|---|---|---|
| | Percent | Percent | Percent |
| Alpha cellulose | 98.8 | 99.6 | 95.7 |
| Soda solubles | 2.5 | 2.1 | 7.2 |
| Ash | 0.08 | 0.05 | 0.16 |
| Ether extract | 0.10 | 0.10 | 0.20 |
| Viscosity (ctps.) | 12.7 | 32.3 | 12.3 |
| Bleach consumption | 0.20 | 0.20 | 0.98 |

It will be noted from Table I that the alpha cellulose content of the wood cellulose is 3% or more lower than the alpha cellulose content of the cotton linters, and that the soda soluble content of the wood cellulose is about 5% higher than the soda soluble content of the cotton linters. Other grades of commercially available, so-called high purity wood celluloses contain up to 10% to 12% of soda soluble material, with a correspondingly reduced alpha cellulose content. The large soda soluble content with a concomitant lower alpha cellulose content is an indication of inhomogeneity, and appears to be one of the reasons the prior practices do not provide wood celluloses of the proper characteristics for acetylation by the usual methods.

It has been found that the factors or analyses normally set forth for celluloses such as the "alpha cellulose content", the "soda soluble content", the "ash", and the like (see definitions at the end of the specification), are not the only factors determining the capability of a cellulose for conversion into derivatives. Other factors, as will be described more fully hereinafter, are not at present capable of precise evaluation, but it is nevertheless true that they are important factors and, in a large measure, determinative of the adaptability of a cellulose to acetylation or other processes of forming derivatives. It has been found that when these other factors are satisfactorily complied with, the cellulose is capable of acetylation or conversion into other derivatives even though its chemical purity is not of an exceptionally high order.

Apparently, if the cellulose is sufficiently reactive, it may be readily converted into useful qualities of derivatives such as acetate. With a lower order of purity, the color and haze of the acetone solutions may be expected to be somewhat higher than results when all of the factors are at their best, including the highest chemical purity. There are many uses open for such cellulose acetate, particularly if the cost is relatively low. For example, the filler material in plastics renders the product darkly colored or at least opaque consequently there is no requirement that the solutions of the acetate be colorless or transparent. It may accordingly be said that for certain commercial uses, the chemical purity of the cellulose and of its derivatives need not necessarily be exceptionally high, provided such cellulose responds readily to treatment to produce the desired derivative such as with acetylating reagents.

None of the commercially available wood celluloses appear to attain the proper combination of the factors which are determinative of acetylatibility, although some samples may even possess a rather good chemical purity. It is a primary purpose of the present invention to provide a process for reconditioning celluloses which are not satisfactorily reactive or are otherwise deficient in the properties that permit satisfactory acetylation. Concomitant avoidance of cellulose degradation (as measured, for example, by alpha cellulose and soda soluble contents) during the reconditioning process is a purpose of this invention.

Another purpose of the present invention is to provide a reconditioned cellulose that is capable of conversion into derivatives, even though the cellulose be of a relatively low order of purity in the chemical sense.

The nature of a cellulose product is dependent in a large measure on the process by which such product has been produced from its raw material. For example, it is important in the process of purifying the wood cellulose that the treatments be such as will not in themselves add any appreciable quantities of soda soluble material at the expense of the unfavorable depolymerization or other degradation of the alpha cellulose component of the pulp. Such products of degradation, we have found, if dried, tend to form irreversible gels which block or seal the network of capillary channels in the fiber structure resulting from the removal of the matrix material originally existing in the wood. The prior practices of purifying wood pulp for derivative cellulose include treatments of such drasticity as to inevitably result in a severe degradation of the cellulose and costly loss of native alpha cellulose in the foregoing particulars. Further, the prior art has failed to recognize the following facts: (1) Cellulose should have an extremely high purity, as high or higher than cotton, before it can be satisfactorily dried and acetylated; and (2) less highly purified cellulose can be acetylated satisfactorily, if the cellulose is purified in a uniform manner and is kept in a permeable, water swollen condition throughout its purification and its percondition maintained thereafter up to the point of acetylation by replacing the water in the cellulose with acetic acid.

It is believed that because of the lack of appreciation of considerations such as the foregoing the prior practices of improving the properties of wood pulp fail to produce a wood cellulose capable of satisfactory acetylation or other derivative preparation.

It has been determined that there are certain requirements that must be met before a wood cellulose is capable of satisfactory acetylation, esterification, or conversion into other derivatives. These requirements include at least four apparently interdependent properties, namely, (1) purity, (2) porosity, (3) a favorable chemical condition of the cellulose fibers to permit adequate reactivity with the acetylating reagent, and (4) a favorable physico-chemical condition of the cellulose fibers which is possibly related to the state or extent of polymerization of the cellulose molecules in the fibers. The proper attainment of conditions represented by these four requirements apparently provides the key to the production of a wood cellulose capable of being readily, uniformly, and economically converted into cellulose acetate or other derivatives. Of the above four factors, purity of the cellulose appears to be of lesser importance where color of the cellulose derivative product is not so important. In other words, if the other three factors appear to be favorable, then the cellulose may be capable of being converted into cellulose acetate or other derivatives even though the color of such derivatives will suffer as a result of the lack of purity of the cellulose. However, as has been intimated before, by no means do all of the uses for cellulose derivatives impose a requirement of absolute clarity on such derivatives.

In applying the principles of the process of this invention, it is necessary to take into account the kind of conventionally prepared raw material to be treated. For purposes of consideration, the types of raw material used in the present invention may be broadly classified into two groups, namely, unbleached sulfite wood pulp, and bleached sulfite wood pulp.

To obtain optimum results from the process, it is desirable to make a further differentiation of the two groups, the raw material being evaluated for purity of the fibers. For instance, the alpha cellulose content offers a convenient means of dividing the bleached pulp material from either group, for example, into one class having an alpha cellulose content of less than 94%, and a second class having an alpha cellulose content of greater than 94%. Further differentiation may be made by means of tests of cuprammonium viscosity, bleachability, and microscopic examination of the manner in which the fibers swell and go into solution in cuprammonium solution.

Having evaluated the raw material as described above, it is then given the proper kind and sequence of treatments to obtain a satisfactory physico-chemical condition and purity necessary for esterification. These treatments are controlled throughout to promote a progressive increase of alpha cellulose content with a concomitant decrease of soda soluble material. At the same time undesirable degradation of the cellulose is avoided and the viscosity reduction is controlled to obtain an end product for esterification with a cuprammonium viscosity of such value as may be desired. A further advantage is the control of the viscosity of the end product from batch to batch within narrow limits.

The treatments given comprise at least one of the following: chlorination, causticization, bleaching, mercerization, and classification. Each is specifically designed and carefully controlled to (1) develop and maintain (without degradation) the proper porosity, purity, and reactivity of the cellulose, and (2) yield products in which any residual impurities are uniformly distributed and to maintain such residual impurities in a condition in which they do not substantially affect the accessibility of the cellulose to esterifying reagents.

Figure 3:
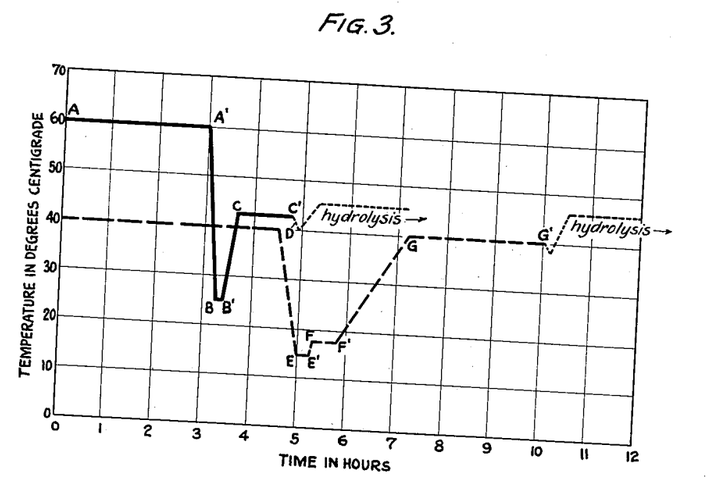
Figure 3 is a graph illustrating time-temperature schedule for an acetylation procedure of a dry, highly purified, reconditioned cellulose of the present invention.
Figure 4:
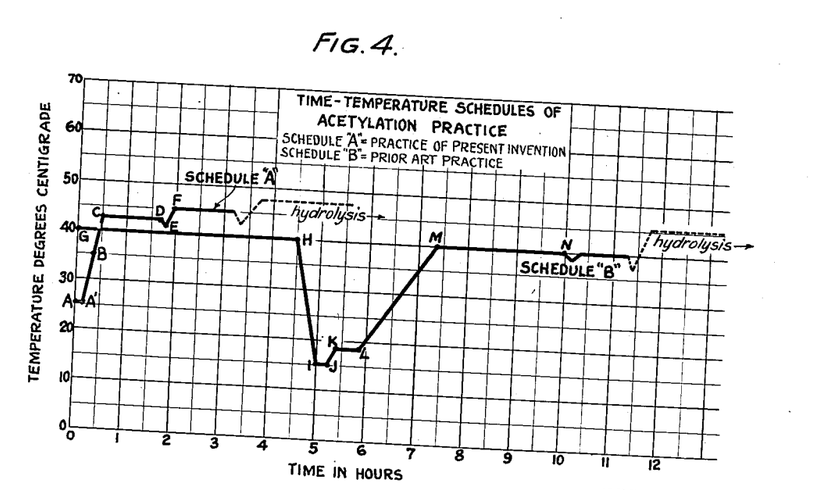
Figure 4 is a diagram showing the time-temperature schedule preferred for the acetylation of a highly purified reconditioned cellulose of the present invention as compared to a typical time-temperature schedule of the art.

By a proper choice of kind and sequence of treatments, various qualities of reconditioned cellulose suitable for esterification may be prepared. However, the esterification procedure should conform to the needs of the particular quality of cellulose used. For instance, the lower qualities of reconditioned cellulose (less than the order of 98% alpha cellulose content) are preferably kept in a wet state, for example, greater than 20% water content. They are converted after displacing the water in the cellulose with a water miscible liquid under conditions which avoid any substantial shrinkage of the cellulose, by an esterification schedule of the order of that shown in schedule A, Figure 2. The higher qualities of purified cellulose (greater than the order of 98% alpha cellulose content and less than the order of 3% soda solubles content) are also preferably kept water wet. They are esterified after replacement of the water with a water miscible liquid, without substantial shrinkage of the cellulose, by an esterification schedule similar to schedule A, Figure 4. Such higher qualities, having a cuprammonium viscosity greater than 15 centipoises, may be dried and acetylated by methods known in the art, but preferably by the acetylation schedule shown in schedule A, Figure 3.

The cellulose acetate obtained from various qualities of reconditioned commercial wood celluloses obtained by the process of this invention is satisfactory for the production of either sheeting, film, lacquers, yarn, plastics, and/or coating compounds, depending on the quality of the reconditioned cellulose used in their production.

When the raw material to be used is in the form of air dry pulp laps or sheets, the first step in the reconditioning process is to water swell and completely defiber the cellulose. This may be satisfactorily accomplished by breaking up the laps or sheets in any convenient manner, forming a thin water slurry, and thoroughly agitating same until substantially no bundles or mats of fibers remain. This treatment is preferably carried out at elevated temperatures, although satisfactory results may be obtained at room temperatures.

The chlorination and causticization treatments are designed to remove ligneous and other impurities present in the raw pulp and preferably to reduce its bleachability to the order of 1.5% (measured by the permanganate number method) regardless of the initial bleached value of the pulp. Thus, starting raw materials varying in bleachability, for instance, between 10% and 30%, are brought to a substantially uniform condition of purity (as measured by the bleach value) by means of the chlorination and subsequent causticization steps.

The chlorination treatments are carried out under very carefully controlled conditions and constitute a step in the process which is an important feature and one of the objects of the invention.

The thoroughly washed and defibered pulp is treated with an amount of chlorine gas sufficient to remove the ligneous material. The chlorine reacts practically instantaneously with pulp with which it comes in contact, being consumed in less than 30 minutes, and continued exposure of chlorine to the pulp will result in inhomogeneity and undue chlorine consumption. Accordingly, the chlorine should be introduced into the pulp in such a manner that all portions of the pulp uniformly secure their quota and no more.

Since the chlorinated compounds are more soluble in alkali than in water, they are conveniently removed by treating the chlorinated pulp with dilute alkali and then thoroughly washing same and adjusting the pH, if necessary, by the addition of hydrochloric acid or lime until neutral in litmus. This sequence of treatments, comprising the chlorination of the pulp and removal of the chlorinated compounds, removes the ligneous material and reduces the bleachability of the pulp to a uniform value. It is an important feature and one of the objects of the invention.

The hypochlorite bleaching treatments are designed and controlled in part to serve two functions; one being the removal of residual impurities such as coloring bodies, and the other the adjustment of the cuprammonium viscosity of the cellulose to a predetermined value. The suprammonium viscosity of the cellulose is a sensitive test for controlling the uniformity of the cellulose from batch to batch. Cellulose degradation during chemical treatment is usually reflected in a reduction in viscosity long before any substantial decrease in alpha or increase in soda soluble content of the cellulose is apparent. The use of solution viscosity as a control thus permits not only the duplication of successive batches within very close limits, but also aids in avoiding any appreciable cellulose degradation during reconditioning.

The bleaching treatment offers a simple and practical means of controlling the pulp viscosity within narrow limits. The process by which this is accomplished is an important feature and one of the objects of the invention.

Figure 1:
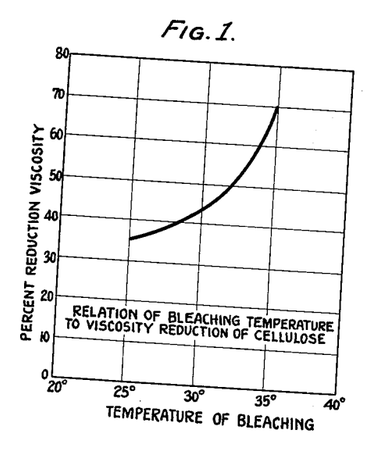
Figure 1 is a graph showing the relationship between temperature and cuprammonium viscosity of the pulp, treated for a predetermined time with calcium hypochlorite solution of a predetermined concentration and amount.

In carrying out the bleaching step it has been found convenient to hold the variables such as time, concentration, and pH constant and to obtain the desired viscosity reduction by varying the temperature of the bleach solution. For example, a curve similar to Figure 1 may be readily developed and used to determine the proper temperature of bleaching after having selected the concentration, time, and other variables at which the treatment is to be given. Either calcium or sodium hypochlorite may be used, but for a very high viscosity product, sodium hypochlorite is preferred. After the completion of the bleach, the pulp is washed with purified water until free of available chlorine.

Hot alkaline treatments have been found especially useful in removing certain types of non-cellulosic material and for increasing the porosity and reactivity of the cellulose. For this purpose, it has been found desirable to use caustic soda solutions of less than 10% concentration and to provide conditions such that a minimum exposure of the cellulose to air occurs in order to avoid oxidation and degradation of the cellulose. Temperatures used may vary from about 50° to 100° C. and the time from 15 minutes to 3 hours, depending on the purity of the cellulose entering the treatment. Following this treatment, the pulp is drained free of excess solution and washed with purified water until the pH has been reduced to 7.0 to 8.0.

Mercerization treatments (for instance, treatments of cellulose with greater than 13% caustic soda solutions at room temperatures) have been found especially useful in producing cellulose of extremely high purity and in opening up the cellulose units to increase their porosity and make them highly reactive toward acetylating reagents. In carrying out this treatment it is desirable to employ as high a consistency as the existing agitation equipment will permit since the efficient use of caustic soda solution is concomitant with the economical production of this type of highly purified cellulose. The effects produced by the mercerization treatment are governed primarily by the concentration of the caustic soda solutions employed rather than by the volume of the solution.

In carrying out this treatment, the thoroughly washed pulp is added to a mercerizing caustic soda solution of such strength that after being diluted by the water held by the pulp the equilibrium concentration will be in the range of 13% to 15%. A satisfactory temperature range to employ is 25° to 30° C. Variations outside these limits are permissible though accompanied in some cases by undesirable effects on the cellulose. For instance, if temperatures as high as 40° C. are used, an appreciable lowering of the viscosity of the cellulose as well as an increase of the color of the acetone solution of the acetate prepared from the finished product will result. Temperatures below 20° C. result in products of lower alpha and higher soda solubility. The treatment time may vary between the limits of ¼ to 4 hours more or less without appreciable variations in the quality of the product.

The desirable properties of cellulose are especially sensitive to the procedure followed in removing the alkali from the cellulose at the completion of the mercerizing treatment.

This may be the result of the effect of oxygen on cellulose in an alkaline environment, or the result of some difference in swelling phenomena that occurs. Regardless of the explanation, however, it has been found that optimum results are obtained if the caustic is washed from the cellulose in as short a time as possible, preferably in less than about 15 minutes.

The conditions under which the mercerizing treatments are carried out and the alkali solutions removed from the cellulose constitute a step in the process which is an important feature and one of the objects of the invention.

The number and sequence of purifying treatments as described above to be given a particular wood pulp to be reconditioned will be determined from the evaluation of the pulp. For example, its alpha cellulose content, soda soluble content, cuprammonium viscosity, bleachability, the action of swelling agents under the microscope, etc. are determined. They will also be influenced, of course, by the quality of the reconditioned product desired.

For instance, a raw material of the first group of the beforementioned classification of the starting material, namely, an unbleached sulfite wood pulp may have an approximate analysis as follows:

| | |
|---|---|
| Alpha cellulose | 85% |
| Soda solubles | 25% |
| Viscosity (ctps.) | 45 |
| Bleachability | 23% |

This material may be reconditioned to several different qualities of acetylatible cellulose.

A first sequence of treatments may be chlorination, followed by a bleaching treatment. From this sequence a wood cellulose product is obtained which is of relatively low purity for derivative purposes and will have an analysis of the order of the following:

| | |
|---|---|
| Alpha cellulose | 88.0% |
| Soda solubles | 20.0% |
| Viscosity (ctps.) | 28 |
| Bleachability | 0.6% |
| Pentosans | 5.0% |

A second sequence of treatments may be chlorination, an alkaline boil, followed by bleaching treatment. The cellulose thus obtained will be of improved purity shown by analysis which will be of the following order:

| | |
|---|---|
| Alpha cellulose | 95.0% |
| Soda solubles | 6.0% |
| Viscosity (ctps.) | 17.6 |
| Bleachability | 0.75% |
| Pentosans | 2.9% |

A third sequence of treatments may be chlorination, a dilute alkaline boil, a bleaching treatment, and a second alkaline boil. The cellulose obtained from this sequence will be still further improved in purity, especially as measured by the soda soluble content, and will have an analysis of the order of the following:

| | |
|---|---|
| Alpha cellulose | 96.0% |
| Soda solubles | 2.5% |
| Viscosity (ctps.) | 22 |
| Bleachability | 0.4% |
| Pentosans | 3.0% |

A fourth sequence of treatments may be a chlorination, a dilute alkaline boil, a bleaching treatment, a second alkaline boil and a final bleaching treatment. The cellulose obtained from this sequence will have an analysis of the order of the following:

| | |
|---|---|
| Alpha cellulose | 96.0% |
| Soda solubles | 2.3% |
| Viscosity (ctps.) | 17 |
| Bleachability | 0.3% |
| Pentosans | 2.7% |

The celluloses obtained from the above sequences contain a relatively high content of residual impurities. They are not usually acetylatible on a commercial scale by the known methods of the art. However, they are capable of acetylation by an esterification method similar to that described in the copending application of Lionel Goff et al., S. N. 81,845, filed May 26, 1936, in which the water in the reconditioned cellulose is displaced with acetic acid, the acetic acid-wet cellulose being subjected to elevated temperature and esterification completed in less than 2 hours by the addition of esterifying reagents under conditions described therein.

A very highly purified and reactive, reconditioned cellulose may be prepared by mercerizing the products of the second, third, and fourth sequences described above. A typical analysis of material so obtained is described as follows:

| | |
|---|---|
| Alpha cellulose | 98.5% |
| Soda solubles | 2.5% |
| Viscosity (ctps.) | 18 |
| Bleachability | 0.25% |
| Pentosans | 2.5% |

If the viscosity of such material is of the order of 15 centipoises or greater, it may be dried and acetylated by the known methods of the art. However, the preferred practice is to remove the water from this type of product by displacement with acetic acid and subsequently to esterify the cellulose by the addition of acetylating reagents under conditions described hereinafter.

A raw material of the second group of commercially available wood pulps, consisting of bleached wood cellulose, should be examined for the character of its swelling action and solution in cuprammonium to determine whether or not the pulp is over-bleached. Pulp that has been over-bleached does not give the characteristic bead-like swelling of properly bleached pulp in cuprammonium solution, but, instead disintegrates into small, fiber-like particles throughout its fiber length. Over-bleached pulp tends to give low yields of reconditioned cellulose and is considered an inferior raw material for esterification. A commercially bleached sulfite pulp having an analysis of the order of the following:

| | |
|---|---|
| Alpha cellulose | 90.0% |
| Soda solubles | 17.0% |
| Viscosity (ctps.) | 11 |
| Bleachability | 0.8% |
| Pentosans | 3.5% | may be reconditioned by a sequence of treatments comprising a dilute alkaline boil, a bleaching treatment, and a mercerization. The cellulose resulting from this treatment will have an analysis of the order of the following:

| | |
|---|---|
| Alpha cellulose | 98.5% |
| Soda solubles | 3.0% |
| Viscosity (ctps.) | 8 |
| Bleachability | 0.3% |
| Pentosans | 3.0% |

Such cellulose is preferably esterified by the addition of esterifying reagents after displacement of water in the cellulose with acetic acid as described hereinafter.

A commercial bleached sulfite pulp of higher purity, having an analysis of the order of the following:

| | |
|---|---|
| Alpha cellulose | 96.0% |
| Soda solubles | 7.0% |
| Viscosity (ctps.) | 20 |
| Bleachability | 0.25% |
| Pentosans | 2.6% | may be reconditioned by giving the cellulose a controlled mercerization treatment. The resulting product will have an analysis of the order of the following:

| | |
|---|---|
| Alpha cellulose | 98.5% |
| Soda solubles | 3.0% |
| Viscosity (ctps.) | 19 |
| Bleachability | 0.25% |
| Pentosans | 2.3% |

This highly purified cellulose is preferably esterified after removing the water from the cellulose by displacement with acetic acid and adding esterifying reagents, all under conditions as described hereinafter. However, when the viscosity of the reconditioned cellulose is of the order of 15 centipoises or greater, it may be dried and esterified by the well known methods of the art.

In order more particularly to describe the present invention, there follows the description of several typical embodiments of the invention. It will be understood that the various features set forth in the examples are by way of illustration only, and may be varied considerably within the scope of the present invention.

*Example A*

For this example, unbleached spruce sulfite pulp is used as the raw material, a sample of which has an analysis as follows:

| | |
|---|---|
| Alpha cellulose | 86.0% |
| Soda solubles | 25.0% |
| Viscosity (ctps.) | 45 |
| Bleachability | 23.0% |

The first step in the reconditioning process is to swell the pulp in water and completely defiber it. Such pulp is usually in the form of laps or sheets which are broken up by any convenient manner to form a thin water slurry, such as, for example, a 1% to 3% pulp consistency. The slurry is thoroughly agitated until substantially no bundles or mats of fibers remain. This treatment is preferably carried out at about 70° C., although satisfactory results may be obtained at room temperature.

The defibered water slurry is transferred to a suitable chlorination tank equipped with highly efficient agitation and which can be tightly closed. The consistency is adjusted to 3% to 10% and the temperature to 25° C. 3.68 pounds of chlorine per 100 pounds of pulp, oven dry basis (calculated on 16% of the bleachability), are then incorporated into the pulp slurry at a uniform rate of flow over a period of 20 to 30 minutes, during continuous agitation. It has been found that the efficiency of the use of reagent is increased by making this addition to the slurry in as short a time as possible. Care must be taken, however, that the addition of the chlorine gas is made under conditions which insure uniform distribution throughout the unchlorinated fibers. Otherwise an unnecessary loss of the chlorine may occur due to reaction with material already chlorinated and incomplete chlorination of some fibers may result. The chlorine will be substantially exhausted in an additional 20 to 30 minutes after the full amount has been added to the slurry. However, the treatment is allowed to continue for a total of 45 minutes with continuous agitation to allow the acids formed by the chlorination treatment to act upon the ash content of the pulp.

At the end of the chlorination treatment a sufficient amount of sodium hydroxide is added to bring the concentration of the alkaline solution to 1% in a treatment consistency of 3%. It is desirable to keep the concentration of the sodium hydroxide solution, which is added to the pulp slurry after exhaustion of the chlorine, at 7% or less as appreciably stronger solutions coming in contact with the chlorinated pulp stock have a tendency to "set" the chlorinated compounds and make them more difficult to remove. The pulp slurry is brought to 100° C. in 20 to 30 minutes and held at 100° C. for 30 minutes. It is then promptly transferred to a continuous filter or centrifuge and washed with purified water. The pH is adjusted, should it be necessary, by the addition of hydrochloric acid or lime until it falls within the range of 7.4 to 7.8. The control of the pH at this point is a convenient means for facilitating the control of the cellulose viscosity in the following hypochlorite bleaching step. It has been found desirable to adhere to the range mentioned or to establish some other suitable working range.

A sample of the pulp at this stage of the purification will have an analysis approximately as follows:

| | |
|---|---|
| Alpha cellulose | 89.0% |
| Soda solubles | 14.0% |
| Viscosity (ctps.) | 44 |
| Ash | 0.35% |
| Bleachability | 1.5% |

An alternate method to the boiling 1% sodium hydroxide treatment for the removal of the chlorinated compounds from the chlorinated pulp is to neutralize the pulp after the completion of the chlorination treatment by the addition of a sufficient amount of sodium hydroxide or milk of lime. The neutralized slurry is thoroughly agitated for 10 to 20 minutes, then transferred to a continuous filter or centrifuge, washed with purified water and the pH adjusted as described in connection with the boiling 1% sodium hydroxide treatment. By this alternate practice, the bleachability of the pulp will be somewhat higher and may necessitate a somewhat stronger concentration of hypochlorite in the subsequent bleaching treatment.

The washed pulp is now ready for a hypochlorite treatment, the purpose of which is twofold: first, to eliminate residual coloring bodies or impurities which may have survived the chlorination and causticizing treatments; and second, to adjust the viscosity to the level which is required at this stage in the purification in order to yield the viscosity desired in the end product. For example, if a viscosity of 30 centipoises in the final purified product is wanted, the pulp viscosity in the calcium hypochlorite treatment will be reduced to 40 to 45 centipoises; whereas if an end product of 18 centipoises is desired, the viscosity is reduced by means of this treatment to approximately 25 to 30 centipoises.

In carrying out the treatment a volume of calcium hypochlorite solution is added to the pulp slurry, which may be at a consistency of 2.5% to 10%, to give a solution containing 0.16% bleaching powder, calculated as containing 35% available chlorine. The hypochlorite is added in the form of a solution containing 60 to 70 grams of bleaching powder per liter and saturated with lime. The viscosity of the pulp is adjusted by regulating the temperature at which the reaction proceeds and maintaining all other conditions constant. The temperature required for reducing the viscosity of the pulp to the desired level for a treatment employing a bleaching time of 4 hours at a consistency of 2.7% and a bleach concentration of 0.16% is readily found by constructing a curve similar to that of Figure 1 from data obtained experimentally on the particular type of pulp to be treated. After the completion of the bleach, the pulp is washed with purified water until free from reagent and soluble reaction products.

The cellulose at this point in the purification is capable of esterification. A typical sample may have an analysis as follows:

| | |
|---|---|
| Alpha cellulose | 94.0% |
| Soda solubles | 6.0% |
| Viscosity (ctps.) | 30 |
| Bleachability | 0.8% |
| Pentosans | 3.0% |

For a reconditioned product of a higher quality, the pulp, after having been treated with calcium hypochlorite and washed, is brought to a consistency of the order of 2% to 12% and a sufficient amount of sodium hydroxide is added to bring the concentration of alkaline solution to 7%. The proper consistency to employ is dependent upon the type and efficiency of the agitation equipment available, it being desirable to provide continuous and uniform mixing under conditions which allow a minimum amount of oxygen to come into contact with the pulp. The temperature of the caustic solution which is added to the pulp slurry is preferably at least 50° C., but may vary anywhere within the range of 50° to 100° C. The slurry is now brought to about 100° C. in about 20 to 30 minutes and is allowed to proceed at 100° C. for about 1½ to 3 hours. It is then promptly transferred to a continuous filter or centrifuge and thoroughly washed with purified water until neutral to litmus. A typical sample of the cellulose resulting from this treatment will have an analysis of the order of the following:

| | |
|---|---|
| Alpha cellulose | 94.1% |
| Soda solubles | 4.0% |
| Viscosity (ctps.) | 18 |
| Bleachability | 0.5% |

This product is readily capable of conversion into cellulose acetate or other esters of very satisfactory properties for many purposes.

For attaining a product yielding slightly less colored derivatives, the pulp is given an additional mild bleach, for example, of the order of 0.5% to 1.0% calcium hypochlorite, based on the weight of the pulp present. This treatment is carried out under conditions which have a minimum effect on the viscosity of the pulp. The present step is also useful where the very closest control of the viscosity of the end product is desired since by selecting the proper temperature, time, concentration and consistency for the treatment, the purified pulp in this stage of its purification is suceptible to even more accurate control of the viscosity than in the first hypochlorite bleaching treatment. The bleaching is usually carried out at 30° C. for about 2 hours, the actual conditions selected being determined by the desired end product viscosity.

The cellulose is washed free of available chlorine and may then be dehydrated and acetylated by the practice to be described below in this example. In some cases it is found desirable to remove the "fine" material from the cellulose fibers, such as by classification. This operation may be carried out at any convenient and economical step of the purification treatment, such as the present one. A satisfactory apparatus for classifying consists of a rubber lined tank, equipped with Allegheny agitation and an 80-mesh Allegheny screen cover. A 1% to 2% slurry of the cellulose in purified water is fed continuously into the tank, the level being maintained at such a height that the agitation throws the slurry against the screen cover and by imparting thereto a pulsating action, discharges the "fines" through the screen. A typical analysis of the pulp classified after the treatments described is as follows:

Alpha cellulose_____________________ 96.7%
Soda solubles_______________________ 4.8%
Viscosity (ctps.)___________________ 16.1
Ash ________________________________ 0.10%
Bleachability______________________ 0.25%

It should be noted that the above described reconditioned cellulose products have an associated liquid content throughout the reconditioning processes of more than 20% and upon the completion of the reconditioning are water swollen, highly porous, and reactive. They may be acetylated by a process in which the water is removed from the cellulose prior to the addition of the acetylating reagents. This is accomplished by a process to be described below in this example, whereby the water is replaced in the cellulose by acetic acid under conditions which avoid any substantial shrinkage or reduction of the porosity and reactivity of the fibers. It is desirable to subject the dehydrated, acetic acid-wet cellulose resulting from the water removal process to elevated temperatures prior to the addition of the catalyst and acetic anhydride. The temperature and time of this treatment may be varied to fit the needs of the reconditioned cellulose used, depending upon its purity, porosity, and reactivity. When acetic acid-wet cellulose is subjected to temperatures of 40° to 70° C. a further removal of coloring bodies is attained which is reflected in a lower color of the solutions of the resulting acetates in appropriate solvents. A distinguishing feature of this method of acetylating reconditioned sulfite wood celluloses, and which is one of the objects of this invention, is that substantially no degrading treatment with catalyst is necessary prior to the acetylation. A typical embodiment of the method is described below.

Figure 5:
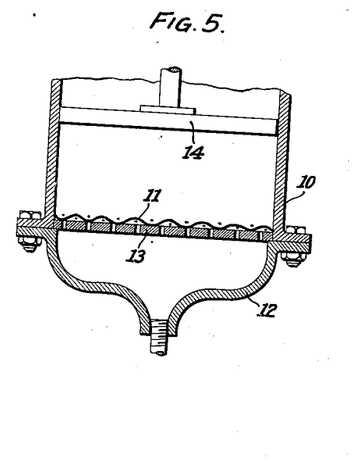
Figure 5 is a diagrammatic vertical section of a batch dehydration vessel.

The purified, water swollen cellulose derived from the above described process is dehydrated in a vessel such as that shown by 10 of Figure 5 equipped with a jacket (not shown). The vessel 10 is preferably constructed of material resistant to acetic acid in any concentration. The diameter of this vessel may, for example, be about 20 inches and the height about 60 inches (above the top of a wire screen 11). The bottom 12 of the vessel 10 is preferably detachable to permit the removal of the cellulose cake after dehydration and a perforated plate 13 in which lies the screen 11 (which may be of about 50 mesh) is fitted in the vessel 10 to retain the cellulose in place.

About 30 pounds of cellulose, for example, is made into a 2% water slurry and the slurry is vigorously agitated until a uniform mixture of the pulp and water is attained and complete separation of any bundles or mats of fibers has been effected. Approximately ⅓ of the pulp-water slurry is discharged into the dehydrating vessel 10 and the excess water is allowed to drain out through the bottom 12. An air pressure of 60 pounds per square inch is ordinarily applied on the surface of the pulp slurry to aid in the removal of the free water from the pulp and is continued until substantially all of the free-water is removed. Second and third cakes are then formed exactly as described above from the remainder of the pulp-water slurry. The three cakes are then squeezed together by means of a piston 14 to form a column of cellulose about 17.0 inches in height and about 20 inches in diameter, and of uniform density.

The 60 pounds air pressure is continued after the formation of the third cake until no further appreciable amount of water is discharged. The temperature of the mass is then adjusted to about 25° C. by means of the jacket. About 40 pounds of glacial acetic acid at about 25° C. is then injected on top of the cake and allowed to soak into the pulp for approximately 5 minutes. It is then forced through the cake by means of air pressure and about 5 minutes after the addition of the first increment of acid, 170 pounds of glacial acetic acid at a higher temperature, for instance, 60° C., is injected on top of the cellulose cake and also forced through the cake by means of the air pressure. After about 45 minutes or less, no appreciable further amount of liquid is discharged and the dehydration is completed.

The cake is then pressed together with a piston until it is 10 inches in height and 20 inches in d'ameter. It is preferred at this point in the operation to bring the total content of the dehydrator to about 60° to 70° C. by means of the jacket and to hold the temperature in about that range for approximately 15 minutes.

The first portion of the effluent from the cake is acid-free water and is diverted to some suitable waste to avoid excessive dilution of the acid subsequently discharged, the latter being preserved for re-use and/or recovery. The acid-wet cake of cellulose will contain approximately 50 pounds of glacial acetic acid, while the remaining 160 pounds of the charge of glacial acid is mixed with a portion of the water displaced from the cellulose cake.

Figure 2:
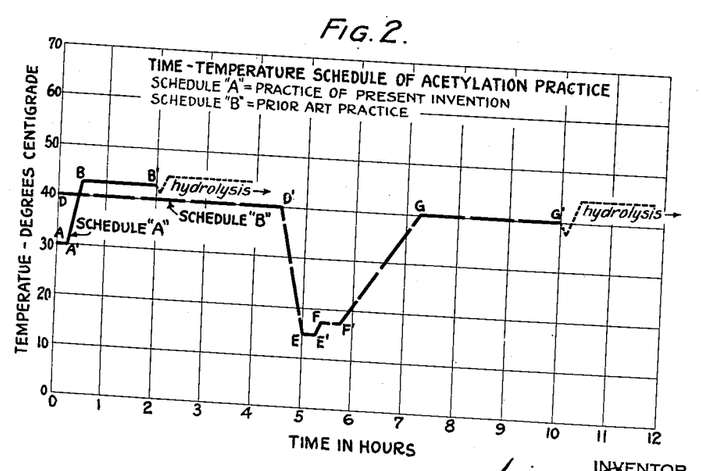
Figure 2 is a graph illustrating time-temperature schedule for an acetylation procedure of a less highly purified reconditioned cellulose (less than 98.5% alpha cellulose) of the present invention, as compared with a current commercial acetylation procedure.

The acetic acid-saturated cellulose is removed from the dehydrator, weighed, and defibered preferably under conditions which avoid substantial exposure to moist air. It is then discharged, preferably through a closed conduit into a jacketed acetylator, for example, provided with efficient agitation means. The temperature is adjusted to the order of 30° C. with agitation, and about 5.3 parts of about 99.7% acetic acid (or sufficient to make a total of about 7.0 parts of acid per part of cellulose, oven dry basis) and about 0.026 part of sulfuric acid (sp. gr. 1.835) to each part of cellulose, are uniformly added over a period of the order of 15 minutes, while the agitation is continued and the temperature maintained at about 30° C. This part of the acetylation cycle is shown in Figure 2, as portion AA' of schedule A. Sufficient acetic anhydride to make about 2.2 parts of 100% anhydride per part of cellulose is then added, preferably at a uniform rate in the order of 15 minutes. During the addition of the acetic anhydride, the temperature of the mass is increased uniformly to about 43° C., partly by the heat of reaction and partly by the application of heat by means of the acetylator jacket (portion A'B). The temperature of the mass is held at about 43° C. by the application of steam or cold water in the acetylator jacket for about 90 minutes (portion BB').

The viscosity of the acetic acid solution of the triacetate is determined at this point, and the acetylation accordingly terminated or continued until the viscosity reaches the predetermined, desired value. The viscosity at which the acetylation is stopped will repend on the use for which the acetate is intended. For instance, an acid solution viscosity of the triacetate of 35 seconds will yield an acetate satisfactory for yarn whereas a viscosity of 1 second or less is more desirable for acetate for lacquer purposes. The original viscosity of the cellulose should also be considered in this respect. Where a high acetone viscosity acetate (greater than 50 seconds) is desired, it is preferable to use a high cuprammonium viscosity cellulose; likewise, for low acetone viscosity acetate (less than 50 seconds), it is preferred to use low cuprammonium viscosity cellulose. It has been found advantageous both to the quality of the resulting acetate and to economy in its production to correlate the viscosity of the purified cellulose used with the desired acetone viscosity of the acetate.

An analysis of a satisfactory acid solution of the acetate at this point, when acetate for sheeting is desired, is as follows:

Color ________________ Greater than 200 p. p. m.
Haze _________________ About 90 p. p. m.
Acetic acid viscosity__ 35 sec.

The acetylation reaction may be stopped at the desired point by adding about 2.2 parts of approximately 50% acetic acid containing about 0.062 part of concentrated sulfuric acid (sp. gr. 1.835) over a period of about 6 minutes.

The mass is then discharged from the acetylator to a hydrolyzing tank where it is continuously agitated and held at about 43° C. until the desired acetyl content has been attained. For example, for a combined acetic acid content of 54.0%, hydrolysis is continued for approximately 18 hours. The hydrolysis is terminated by adding about 0.2 parts of sodium acetate dissolved in about 1.1 parts of acetic acid. The acetic acid acetate solution may now be filtered if necessary. The acetate is then precipitated by allowing it to flow into water or dilute acetic acid. It is then washed free of acid in cold water and treated with water at about 90° C. for about 45 minutes, drained, and dried at about 60° to 70° C.

The cellulose acetate obtained from wood in this manner will yield a solution in acetone having a color, depending on the purity of the cellulose, of approximately 200 parts per million and a haze of less than 200 parts per million. The acetone viscosity may vary from less than 1 second to 150 to 160 seconds or higher depending on the use for which the acetate is intended and the original cuprammonium viscosity of the cellulose employed in the production of the acetate.

For comparative purposes, a second curve (Schedule B) is shown in Figure 2 representing a typical practice of acetylation employed for the production of cellulose acetate from cotton linters in the industry today.

Portion AA' of schedule A represents the treatment of the cellulose with catalyst. During this short period a rapid drop in cellulose viscosity occurs. However, as a result of the low temperature, short time and uniformity of the treatment, substantially no harmful degradation of the cellulose occurs. Portion DE of schedule B is comparable to BB' of schedule A in that it represents the usual treatment of cellulose with catalyst by prior practices. In this case, likewise, an appreciable reduction in viscosity occurs. However, the treatment is given under such conditions of time, temperature, etc., that it is continued long after the first rapid drop in viscosity of the cellulose. In this case a substantial degradation of the cellulose occurs.

Portion EE' of schedule B represents the step of adding the anhydride, with a control of temperature. Portion E'F represents a step of permitting a temperature rise. Portion FF' is another temperature control step. Portion F'G is a controlled temperature rise. Portion DG is accordingly analogous to portion AB of schedule A. Portion GG' represents a period of controlled temperature during which acetylation proceeds to completion, its counterpart being portion BB' in schedule A.

Accordingly the time cycle of the process from cellulose to triacetate of the prior practice (DG' of schedule B, Figure 2) occupies about 10 hours. The equivalent cycle of the present invention (AB' of schedule A, Figure 2) requires only about 2 hours. It is thus clear that the present invention provides an enormous saving in time of conversion of the cellulose to acetate in addition to other advantages.

*Example B*

For a reconditioned cellulose having a purity comparable to cotton linters and of high reactivity towards esterifying reagents, the higher qualities of reconditioned celluloses described in Example A are given a mercerization. This is accomplished by adding the pulp cake to a mercerizing caustic soda solution of such strength that after being diluted by the water held by the pulp, the equilibrium concentration will be in the range of 13% to 15%. A satisfactory temperature range to employ is 25° to 30° C., but variations outside these limits are permissible though undesirable. For instance, if temperatures as high as 40° C. are used in this mercerization treatment, an appreciable lowering of the viscosity as well as an increase in the color of the acetone solution of the acetate prepared from this finished product will be brought about. Temperatures below 25° C. will require the extra expense of refrigeration. The treatment time may vary between the limits of ¼ to 4 hours, more or less without appreciable variation in the quality of the product. The mercerized cellulose is thoroughly washed under carefully controlled conditions as heretofore described.

The mercerizing treatment completes the purification of the cellulose, a typical sample of which then will have the following analysis:

Alpha cellulose _________________________ 98.5%
Soda solubles __________________________ 2.5%
Ether extracts __________________________ .20%
Uronic acid anhydride ___________________ .45%
Ash ____________________________________ .10%
Viscosity (ctps.) ________________________ 22
Bleachability ___________________________ 0.25%

If the reconditioned cellulose has a viscosity of the order of 15 centipoises or greater, it may be dried and acetylated by the conventional processes.

However, very high quality cellulose acetate is obtained if the material is acetylated by the addition of esterifying reagents after the water has been removed from the reconditioned cellulose by displacement with acetic acid. A typical embodiment of this practice is described below.

The reconditioned cellulose may be dehydrated substantially as described in Example A; with the exception that in most cases it is desirable to maintain the temperature of the dehydrating acid at about 25° C. since elevated temperature is unnecessary with the more highly purified and reactive reconditioned cellulose.

The dehydrated cellulose thus prepared is saturated with and contains about 3.2 parts of glacial acetic acid for every part of cellulose (oven dry basis), and less than about 2% water, based on the weight of the cellulose (oven dry basis). It is in the form of a cake which is fed into the hopper of a defibering apparatus, precautions being taken to avoid undue exposure to moist air. One form of suitable defibering equipment consists of a cylinder provided with projecting teeth rotating within a closely fitting casing. The defibered cellulose is then discharged through a closed conduit into a jacketed acetylator which is maintained at 25° C.

The acetylator is preferably of the type hereinbefore described in connection with Example A. As soon as the mass of acetic acid-wet cellulose reaches a temperature of about 25° C., a mixture of about 5.25 parts of glacial acetic acid (99.7% concentration) and about 0.026 part of concentrated sulfuric acid (sp. gr. 1.835) to each part of cellulose (oven dry basis) is slowly added over a period of 10 minutes while agitation of the mass is continued and the temperature maintained at 25° C. (see curve AA' of Figure 4). As soon as all of the mixed acid, i. e., acetic and sulfuric acid, has been added, about 2.31 parts of 95% acetic anhydride (or about 2.2 parts of 100% acetic anhydride) are slowly added over a period of 10 minutes while agitation of the mass is continued. The acetylation from this point on is carried out substantially as described hereinbefore in Example A.

Example C

A good rayon grade of commercial wood cellulose, one sample of which shows the following analysis, is used as a raw material:

| | |
|---|---|
| Alpha cellulose | 92.2% |
| Soda solubles | 10.8% |
| Viscosity (ctps.) | 17.5 |
| Bleachability | 0.37% |
| Moisture content | 5.0% |

All attempts to satisfactorily acetylate this product failed, the dopes being too highly colored and the cellulose being incompletely acetylated.

The pulp is immersed in a concentrated sodium hydroxide solution of 7%, ±1% at a consistency of 4% to 12% for a period of 1½ to 3 hours at 100° C. This treatment is preferably carried out under conditions which will allow the minimum amount of atmospheric oxygen to come in contact with the pulp. When the treatment is completed, the solution is drawn off and the pulp washed with purified water until the pH has been reduced to 7.0 to 8.0.

The washed pulp is now treated with a 1% calcium hypochlorite solution (based on the pulp) at a consistency adjusted to between 3.5% and 10% at a temperature of 21° to 23° C., and allowed to react for 2 hours. The pulp is then washed with purified water until, when tested with the known indicators, it shows no presence of hypochlorite. At this point it will have approximately the following analysis:

| | |
|---|---|
| Alpha cellulose | 93.0% |
| Soda solubles | 6.0% |
| Bleachability | 0.5% |

Following this bleaching treatment, the pulp is immersed and thoroughly agitated in a 13% to 15% NaOH solution at 25° C. to 30° C. for ¼ to 4 hours at 4% to 12% consistency after which the caustic soda is removed by draining or other convenient means. After draining, the residual caustic soda in the pulp is uniformly and rapidly washed out as described in Example B with purified water until the pH is 7.0 to 8.0.

The pulp may be classified as described in Example A to remove cell wall debris, parenchyma cells, fragments of same, fragments of fibers and vessels, and adsorbed material from the tracheids. The long-fibered fraction of the pulp is discharged into an appropriate vessel from the classification tank and treated with ¼% (.25%) concentration of hydrochloric acid or acetic acid at a 3% consistency for 15 minutes at 20° to 30° C. The pulp is then washed with purified water which is at a pH of 7.2 to 7.6, low in total solids, copper, iron, and other metallic impurities, until the acid concentration has been reduced to approximately .05% and then dewatered. Sufficient hot purified water at 60° to 65° C. and at a pH of 7.0 to 7.4 is then added to give a 3% slurry and the mass agitated for 30 minutes and then dewatered and cooled to approximately 20° C. with cold purified water to about 50% moisture content. The water-wet pulp will have a pH of 7.0 to 8.0.

All of the preceding treatments are preferably carried out as in Example A under the precise conditions of control specified. The pulp will now have approximately the following analysis:

| | |
|---|---|
| Alpha cellulose | 98.9% |
| Soda solubles | 3.2% |
| Viscosity (ctps.) | 15.7 |

This reconditioned cellulose will acetylate satisfactorily according to the process described in Example B.

Example D

Another type of commercial wood pulp which has been processed to attain an especially high degree of purity, the analysis of a sample of which is as follows, may be used:

| | |
|---|---|
| Alpha cellulose | 95.7% |
| Soda solubles | 7.2% |
| Ash | 0.16% |
| Viscosity (ctps.) | 12.4 |
| Bleachability | 0.98% |
| Moisture content (app.) | 5.0% |

This cellulose is defibered by agitation in water slurry and is subjected to a mercerizing treatment substantially as described in Example B.

The resulting reconditioned cellulose may have an analysis as follows:

| | |
|---|---|
| Alpha cellulose | 98.5% |
| Soda solubles | 3.0% |
| Viscosity (ctps.) | 11.3 |
| Bleachability | 0.3% |

This reconditioned cellulose is readily acetylatible by the method described in Example B.

The cellulose acetate obtainable from the reconditioned celluloses of the present invention may vary widely in quality and cost, depending on the quality of reconditioned cellulose employed in their esterification. The low cost of the reconditioned wood cellulose as compared with cotton linters as a raw material permits a much more extensive use of cellulose acetate in plastics, yarn, sheeting and coating compounds, since for many purposes the cellulose acetate has superior qualities to the cellulose nitrate and synthetic resins now used.

Table II below shows the analyses of three samples of cellulose acetate. Sample A is a commercially prepared acetate from cotton linters.

Sample B is a cellulose acetate prepared from the higher quality reconditioned cellulose of the present invention. Sample C is a cellulose acetate prepared from the lower quality or unmercerized reconditioned cellulose of the present invention.

TABLE II

|  | A | B | C |
| --- | --- | --- | --- |
| Acetyl content___________percent__ | 53.4 | 53.9 | 53.4 |
| Charring point___________°C__ | 227 | 209 | 207 |
| Melting range____________°C__ | 248–287 | 227–270 | 250–272 |
| Stability, acetic acid_____percent__ | 0.04 | 0.06 | 0.08 |
| Acetone viscosity________seconds__ | 16.8 | 19.3 | 7.4 |
| Acetone solution turbidity____p. p. m__ | 170 | 80 | 200 |
| Acetone solution, color_______p. p. m__ | 100 | 110 | 200 |

It is apparent that sample B is at least equal to sample A and that sample C is definitely inferior to sample A only in color and turbidity of acetone solution, which is unimportant for many uses such as plastics and yarn. For other uses the haze may be removed by filtration. The high quality of the wood cellulose acetate, as represented by samples B and C, is considered a direct result of the fact that the reconditioning treatment of the cellulose in the present invention is non-degrading in character.

The foregoing examples serve to point out, in a detailed manner, certain embodiments of the present invention. However, the scope of the invention will be more readily understood and its implications will become more apparent, in view of the following consideration of the more or less theoretical aspects of the present invention and its processes and products as hereinbefore described.

Wood cellulose differs fundamentally in structure from the cotton fiber in that the wood cellulose fiber is a network of cellulose filled with amorphous impurities such as lignin, pectin and the like, whereas in the cotton fiber its smaller amount of impurities are somewhat segregated in the membrane around the lumen and in the cuticle or membrane around the outside of the fiber.

Thus, the impurities in the cotton fiber are readily accessible to and easily removed by purifying reagents; whereas in the wood fiber the impurities are relatively inaccessible and offer difficulty in complete removal.

A purified cotton fiber is substantially unchanged physically from its original state. A highly purified wood fiber, on the other hand, may be described as a skeleton or honeycomb of cellulose.

This difference in physical structure must be given weight when either purifying or esterifying the two types of fibers.

The wood cellulose, in order to be esterifiable, must be permeable or, in short, the cellulose must be readily accessible to esterifying reagents. The amorphous impurities in the wood cellulose fiber are of such a character that unless they are completely removed or are properly conditioned they prevent accessibility of esterifying reagents to the cellulose and an attempted acetylation results only in a highly colored slurry of incompletely acetylated cellulose fibers.

In the conventionally prepared celluloses used as raw material in the process herein described, the impurities are in such an impermeable condition as to retard or hinder acetylation. Attempts of the prior practices to overcome this condition have been, for the most part, of such nature as to degrade the cellulose without accomplishing the desired end.

By the process of the present invention such impurities, in the case of the lower quality reconditioned cellulose, are partially removed and the residual impurities are conditioned so as to be permeable to the esterifying reagents with substantially no cellulose degradation. In the case of the higher quality reconditioned cellulose the impurities are, for all practical purposes, substantially completely removed so that their influence becomes negligible.

This end is accomplished by choosing and controlling the treatments as described heretofore, so that little or no cellulose degradation occurs, maintaining the liquid content of the cellulose greater than 20%; the cellulose becomes esterifiable and successive batches are readily duplicable.

In the foregoing specification and following claims, terms have been used having the following meanings:

*Dilute caustic*, as used herein, refers to caustic solutions not having a mercerizing effect on the cellulose.

*Permeability*, as used herein, is defined as the absorptive power of a substance, particularly the fibers with which the present invention is concerned. By fibers of high permeability, as used in this specification, is meant a swollen skeletal fiber structure comprising a network of capillary channels substantially cleared of amorphous and other non-cellulosic material. The network of capillary vessels of such swollen fibers serve to distribute liquid throughout the cell walls of every fiber. Such liquids provide a diffusion medium by means of which the desired reagents are able promptly to reach every part of the fiber. These liquids may be the actual treating solutions themselves. In addition to the network of channels mentioned above, the cell wall substance should be in a substantially completely swollen condition in order to assist, by diffusion through the swollen cell walls, the work of the capillaries in the distribution of liquid uniformly throughout the fibers. Fibers are considered to be less permeable when the amorphous and other non-cellulosic material has been insufficiently removed to provide a network of substantially unobstructed capillary passages, or the fiber structure is insufficiently swollen, or both. Permeable fibers will absorb more liquid than impermeable fibers.

*Reactivity*, as used herein, is defined as that property of cellulose which permits its acetylation to the acetate products by the process described and claimed herein; and conversely, cellulose is considered unreactive when it cannot be converted into acetate by the processes described herein.

*Cuprammonium viscosity*, as used herein, means the viscosity number or value obtained according to the following method: The cuprammonium solution was prepared by the action of air on electrolytic copper in the presence of strong ammonia water. The copper concentration of the solutions employed for viscosity determinations was 30, ±2 g. per liter and the ammonia content was 165 g., ±2 g. per liter. The concentration of cellulose employed was 0.6 g. (oven dry basis) per 100 cc. of cuprammonium solution. The cellulose sample for this determination was dried at 70° C. to 4% moisture content. After weighing out 0.6 g. (oven dry basis), the sample was moistened, squeezed to a uniform weight of 2 g. and then dispersed in cuprammonium solution in an atmosphere of hydrogen from which oxygen has been completely removed. The viscosity measurements were made at 25° C. with a modified Ostwald pipet, constructed according to the specifications of the American Chemical Society committee on the viscosity of cellulose (Journal of Industrial & Engineering Chemistry, I, #49; 1929). The time of flow in seconds was converted to centipoises on the basis of the calibration of the pipet with oils of known viscosity in centipoises obtained from the United States Bureau of Standards.

*Viscosity of acetic acid solutions of acetate*, as used herein, indicates the number of seconds required for a number 7 lead shot to fall through 5 centimeters of the acetylation solution at 40° C. This relates only to the viscosity of acetic acid solutions of cellulose acetate.

*Acetone viscosity*, as used herein, is defined as the number of seconds required for a $\frac{1}{16}$ inch steel ball to fall (in a tube 14 inches long by 1 inch in diameter) through 10 inches of a solution at 25° C., the solution consisting of 85% acetone (anhydrous) and 15% cellulose acetate, (2% to 5% moisture) by weight. This relates only to the viscosity of acetone solutions of cellulose acetate.

*Color and haze* are used herein to indicate the color and haze of acetic acid or acetone solutions of cellulose acetate, which are measured by comparison with standards of known color and turbidity, expressed in parts per million. The standards are those used for water analysis, recommended by the American Public Health Association ("Standard Methods of Water Analysis", pages 4–11; 7th edition, 1933; published by American Public Health Association) and consists of platinum cobalt (for color determinations) and Fuller's earth (for turbidity comparisons). With the materials recommended by the American Public Health Association, a series of standard solutions ranging from 10 p. p. m. to 200 p. p. m. inclusive at intervals of 10 p. p. m. were prepared for both color and haze. 100 cc. of each of these solutions was hermetically sealed in an 8-ounce, wide-mouth, glass-stoppered bottle having an internal diameter of $2\frac{1}{16}$ inches. The acetate dope samples to be measured were prepared in bottles identical with those employed in making the color and haze standards and compared under a controlled source of light, first with the color standards until the particular solution of each of which most nearly corresponded to the dope under comparison was found, and then with the haze standards in conjunction with the most appropriate color standard. The measurements of the color and turbidity of the acetate dope are made exactly 1 hour after the dope has been killed by the addition of the dilute acetic acid. At the time of measurement, the dope must be absolutely free from air bubbles and at a temperature of 25° C. and the quantity of dope under comparison in the bottle must not be less than 100 cc. It has been found that color and haze ratings by this method can be made to an accuracy of approximately 10 p. p. m.

*Alpha cellulose*, as used herein, is defined as that portion of a sample of cellulosic material not dissolved by 17.5% sodium hydroxide solution at 20° C., determined by a refinement of the method described by H. F. Lewis in "Technical Association Papers" Series XVII, #1, 436 (1934).

*Soda soluble material* is defined as that portion of a cellulosic sample dissolved when it is subjected to the action of 7.14% NaOH solution at the boiling point of water for 3 hours by a refinement of the method of Griffin, "Technical Methods of Analysis", page 492 (1927 ed.).

*Bleachability of cellulose*, as used herein, is a measure of the materials oxidizable by potassium permanganate in the presence of an acid under specific conditions of time, temperature, and concentration, and is expressed in terms of standard bleaching powder containing 35% available chlorine. The determination consists in treating a 1 gram sample of material completely dispersed in 750 cc. of a solution composed of 0.133 N sulfuric acid and N/300 potassium permanganate for 5 minutes at 25° C.; reacting the unconsumed potassium permanganate with potassium iodide, and back titrating with sodium thiosulfate. A detailed description of the method, including the conversion table for expressing the permanganate number in terms of per cent bleaching powder of 35% available chlorine, was published by T. A. P. P. I., Series XVII, #1, 146 (1934), "Permanganate Number of Pulp" by R. N. Wiles.

I claim:

1. In the manufacture of purified wood cellulose suitable for the production of chemical derivatives, the process of converting unbleached sulphite wood fibres into a permeable network of activated cellulose which comprises removing the ligneous material by treatment of the fibres with an amount of chlorine that is exhausted in the order of 20–30 minutes, removing the reaction products with dilute alkali, removing oxidizable material by a hypochlorite bleach, terminating the bleach having a pH greater than 7.4 before the cellulose is substantially degraded, and rendering the residual membranous material permeable by boiling in sodium hydroxide solution of the order of 7% concentration.

2. The process for the manufacture of cellulose acetate from unbleached sulphite wood pulp which comprises removing the ligneous material by treatment of the pulp with an amount of chlorine that is exhausted in the order of 20–30 minutes, removing the reaction products with dilute alkali, removing oxidizable material by a hypochlorite bleach having a pH greater than 7.4, terminating the bleach before the cellulose is substantially degraded, boiling the bleached unmercerized pulp in sodium hydroxide solution of the order of 7% concentration, treating the pulp with sodium hydroxide solution of the order of 13%–15% concentration at normal temperatures, thereafter treating the pulp with acetic acid, and acetylating the treated pulp.

LIONEL ELMER GOFF.